E. S. ROYER.
CULINARY SPOON.
APPLICATION FILED OCT. 17, 1919.
1,334,169.
Patented Mar. 16, 1920.
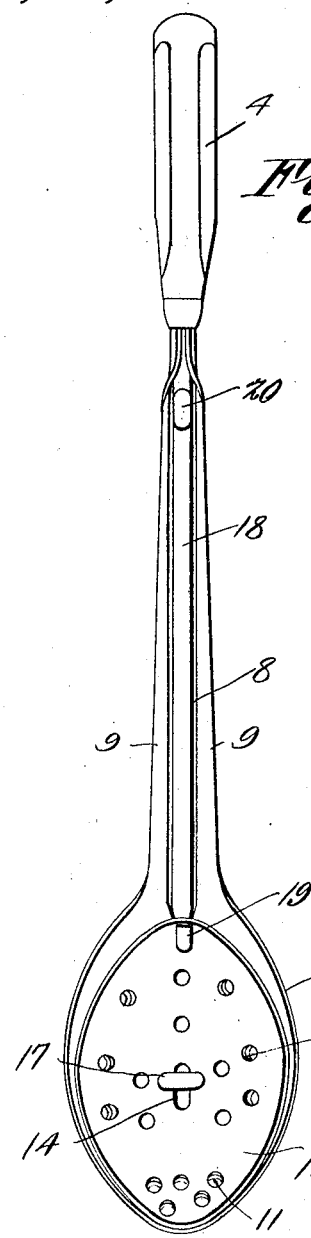
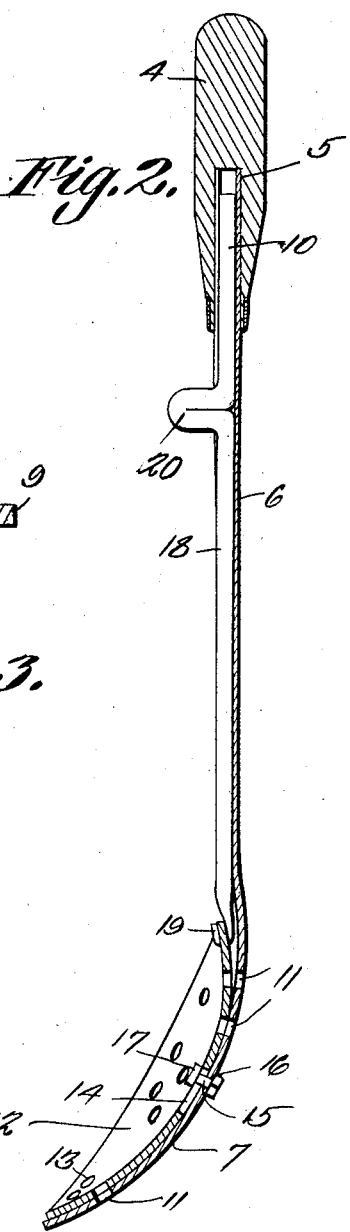
Fig. 1.  Fig. 2.  Fig. 3.
Witness
Inventor
E. S. Royer
By C. A. Snow & Co.
Attorneys.

UNITED STATES PATENT OFFICE.

ENOS S. ROYER, OF WILKES-BARRE, PENNSYLVANIA.

CULINARY SPOON.

1,334,169.  Specification of Letters Patent.  Patented Mar. 16, 1920.

Application filed October 17, 1919. Serial No. 331,299.

*To all whom it may concern:*

Be it known that I, ENOS S. ROYER, a citizen of the United States, residing at Wilkes-Barre, in the county of Luzerne and State of Pennsylvania, have invented a new and useful Culinary Spoon, of which the following is a specification.

My invention relates to new and useful improvements in culinary spoons, and an important object of the invention is to provide a device which may be used as an ordinary cooking spoon, or as a utensil for dipping vegetables and the like from a cooking utensil containing liquid or the like in such a manner that the vegetables will remain upon the bowl of the spoon, while the liquid will drain through the bowl of the spoon into the receptacle.

Another important object of the invention is to provide a device which is strong, durable, inexpensive to manufacture, and highly efficient in practice.

With the above and other objects in view which will appear as the description proceeds, the invention resides in combination and arrangement of parts and in the details of construction hereinafter described and claimed, it being understood that, within the scope of what is claimed, changes in the precise embodiment of the invention shown can be made without departing from the spirit of the invention.

In the accompanying drawings, forming a part of the description and wherein like numerals are employed to designate like parts throughout the several views.

Figure 1 is a plan view of the invention;

Fig. 2 is a longitudinal section of the same; and

Fig. 3 is a transverse section taken on the line 3—3 of Fig. 1.

In the drawings, wherein for the purpose of illustration is shown a preferred embodiment of the invention, the numeral 4 designates a handle of any desired configuration, having a reduced end through which extends an axially arranged recess 5, this recess extending a substantial distance into the handle proper. The shank 6 and bowl 7 of the spoon are formed from a single piece of material, the shank being channeled longitudinally throughout its entire length as at 8 thereby providing an outwardly extending flange 9 upon each side of the channel therein, as shown to advantage in Fig. 3. The upper terminal 10 of the shank 6 is rolled to form a tubular portion which is inserted in the recess 5 of the handle to be snugly received therein whereby the handle is securely retained upon the shank. The bowl 7 of the spoon is equipped with a plurality of openings 11, and a central aperture for a purpose which will hereinafter appear.

A supplemental bowl 12 is movably associated with the bowl 7, and is of substantially the same shape as the latter, but is slightly smaller to be mounted within the bowl 7 and whereby the supplemental bowl 12 will not move out of the confines of the bowl 7. The supplemental bowl is provided with a plurality of openings 13, which at times are adapted to aline with the openings 11 of the bowl 7, and is also equipped with a central longitudinally extending slot 14 to accommodate the shank 15 of the stop which extends through the central aperture in the bowl 7. A nut 16 is threaded upon the shank 6 to abut with the under side of the bowl 7 and retains the head 17 of the shank in proper relation with the upper face of the supplemental bowl upon opposite sides of the slot 14.

In order to move the supplemental bowl longitudinally of the bowl 7, a rod 18 is slidably mounted in the channel 8 of the shank, and one of its ends is loosely connected with the supplemental shell as at 19, while its opposite end is slidably mounted in the tubular portion 10 of the shank. The upper portion of the rod adjacent the handle 4 is folded upon itself to form an upstanding grip 20, whereby the thumb of the operator's hand may be conveniently engaged with the grip 20 to slide the rod 18 as desired.

When it is desired to use the utensil as a strainer or colander or for any other purpose for which the spoon is adaptable when the openings in both bowls are alined, the grip 20 is engaged by the operator's thumb and forced toward the bowl of the spoon, which action causes the supplemental bowl 12 to move toward the free end of the bowl until the shank 15 of the stop engages the end of the slot 14 adjacent the shank. When the supplemental bowl reaches this position, the openings 13 therein will be alined with the openings 11 in the bowl 7. It is to be noted that when the openings in both bowls are alined that the edges of the supplemental bowl are within the confines of the edges of the bowl 7. If it be desired to use the utensil as an ordinary cooking spoon, the grip 20 is engaged by the thumb and drawn rearwardly toward the handle 4 until the end of slot 14 adjacent the free end of the supplemental bowl abuts with the shank 15 of the stop, to cause mis-alinement of the openings, in the two bowls.

Having thus fully described the invention, what is claimed is:

A culinary utensil comprising a handle having an axially extending recess therein, a channeled shank having one end rolled to form a tubular portion to be received in said recess, a bowl secured to the said shank and equipped with a plurality of openings therein, a supplemental movable bowl having a plurality of openings therein, and a rod slidably mounted in said channeled shank with one end connected with said supplemental bowl and its other end slidably mounted in said tubular portion of said shank and recess, and a grip on said rod for moving the same.

In testimony that I claim the foregoing as my own, I have hereto affixed my signature in the presence of two witnesses.

ENOS S. ROYER.

Witnesses:
W. P. WALSH,
R. J. O'DONNELL.